No. 788,278. PATENTED APR. 25, 1905.
E. H. PORTER & B. CURRIER.
POTENTIAL REGULATOR.
APPLICATION FILED OCT. 7, 1904.
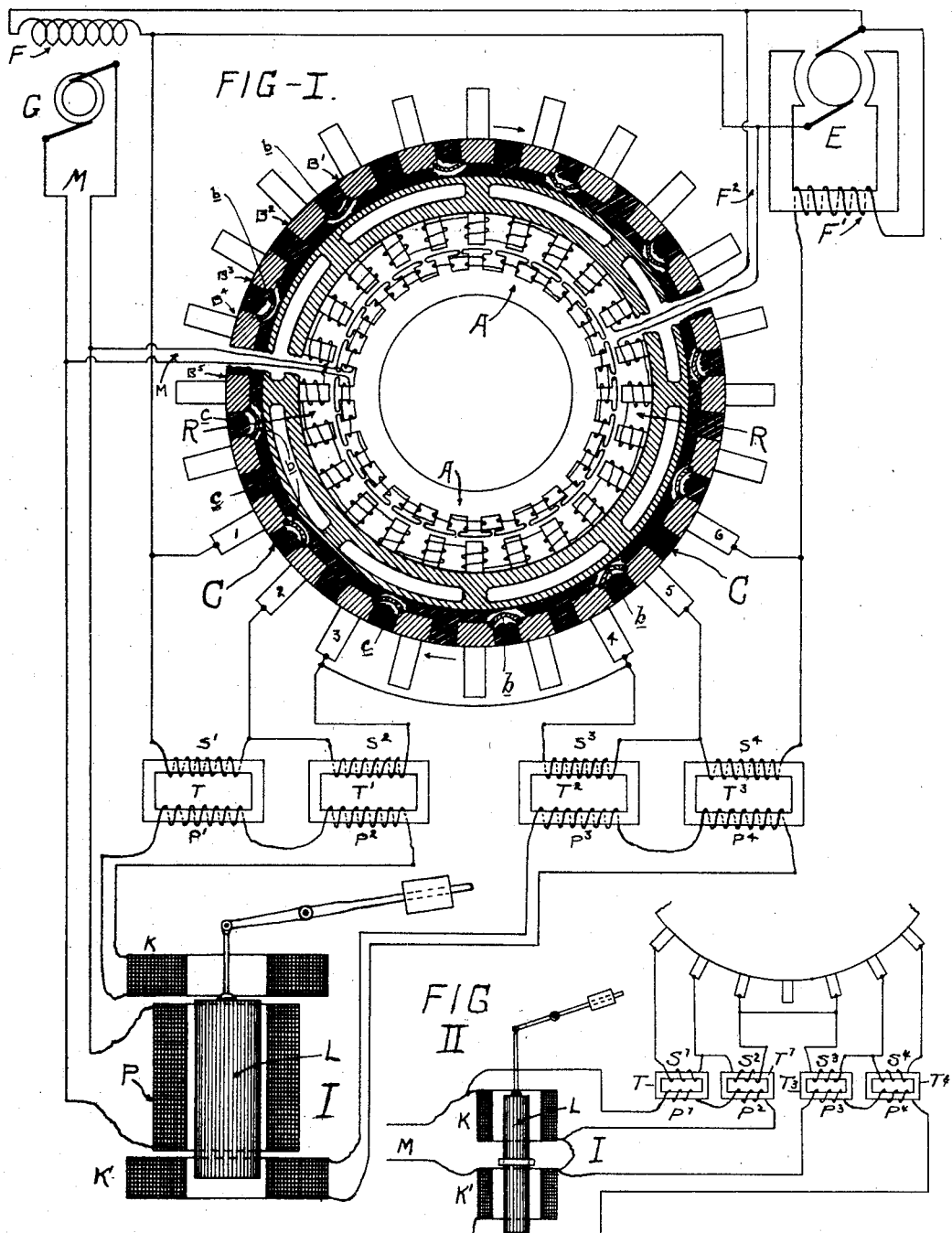
WITNESSES:
M. R. Cleland
J. H. Woodhead
INVENTORS:
Edwin H. Porter and
Burleigh Currier
BY
F. DeWitt Goodwin
ATTORNEY.

No. 788,278. Patented April 25, 1905.

UNITED STATES PATENT OFFICE.

EDWIN H. PORTER AND BURLEIGH CURRIER, OF PHILADELPHIA, PENNSYLVANIA.

POTENTIAL-REGULATOR.

SPECIFICATION forming part of Letters Patent No. 788,278, dated April 25, 1905.

Application filed October 7, 1904. Serial No. 227,520.

*To all whom it may concern:*

Be it known that we, EDWIN H. PORTER and BURLEIGH CURRIER, citizens of the United States, residing at Philadelphia, in the county of Philadelphia and State of Pennsylvania, have invented certain new and useful Improvements in Potential-Regulators, of which the following is a specification.

Our invention relates to commercial alternating-current generators, and particularly to means for maintaining a fixed potential at the terminals of the said generators.

The object of our invention is to provide an automatic regulator for an alternating dynamo which shall automatically maintain a constant alternating potential at the terminals of the dynamo or a potential of a predetermined rise or fall regardless of the current or load and speed of said dynamo. Regulators, both mechanical and electrical, have been designed to accomplish this purpose with more or less success. These have all had various defects, such as sluggishness, tendency to race, sparking contacts, and complicated construction, &c. We have endeavored to avoid these difficulties and construct a regulator of simple form and of great reliability and accuracy.

Our invention contemplates using the standard alternators and exciters of modern practice and regulating the field strength of either exciter or main dynamo by inserting a unidirectional current of electromotive force in series with either field-circuit in such a manner as to either add to or depress the electromotive force and current in said field-circuits, and therefore add to or depress the electromotive force of the alternating generator to maintain it practically constant.

Throughout the specification the words "electromotive force" are abbreviated to "E. M. F." and "direct current" to "D. C."

Referring to the drawings, Figure 1 is a diagrammatic view showing our regulator and a generator, exciter, and transformers used in connection therewith. Fig. 2 is a diagrammatic view showing the regulator connected with a different arrangement of coils.

In the drawings, G represents an alternating-current generator supplying the main circuit M. The generator G has a field-circuit F supplied by an exciter-dynamo E, whose field-circuit is F'. The control of the potential of the alternating generator G is accomplished by the variation of the strength of the exciting-current flowing in the main field-circuit F. The variation of this main exciting-current is accomplished either directly or by the variation of the strength of current flowing in the field-circuit F' of the exciter-dynamo. It is well known in the art that the alternating potential of the generator can be controlled by varying the field strength of either the exciter-dynamo E or the field strength of the generator itself by varying the strength of current flowing in either. We then employ an alternating E. M. F. and current supplied from the terminals of the generator to be regulated. This may be either supplied direct or through suitable potential-transformers. This current is supplied through the rectifier in series with the D. C. field-circuit. The E. M. F. and strength of this current is varied by the movement of a laminated core with inductive relation to coils through which the current is flowing before being rectified in response to variations of the potential of the main generator-circuit to be regulated.

An induction-regulator is shown at I and consists of the primary coil P, connected in the circuit M, and the secondary coils K and K', located at either end of the primary coil. The three coils of the regulator are provided with a hollow cylindrical interior, in which is suspended a laminated core L, counterbalanced so as to move freely within said coils in response to variations in the strength of the current flowing in the primary coil P. It will be readily understood that as the core moves with inductive relation to the secondary coils K and K' the E. M. F. of one coil is increased at the same time the E. M. F. in the other coil is decreased. The current from the coils K and K' of the regulator is carried through the medium of the transformers T T' T² T³ to the alternating-current rectifier, more fully described in another application. The rectifier consists of a stationary armature A of a synchronous motor having a revolving field R. The generator G through the circuit M supplies the motor-armature A with an alternating-current, also the current to be rectified.

The commutator C is carried by the revolving field R of the motor and is composed of bars $B' B^2 B^3 B^4$ and so on separated by insulating material $c$. The commutator-bars are arranged in pairs, as $B'$ and $B^2$ or $B^3$ and $B^4$, having permanent connections $b$ between them. Stationary brushes 1 2 3 4 and so on are in working contact with the commutator C. As the commutator-bars are arranged in pairs, they will short-circuit any two of the brushes successively as the commutator revolves.

The field R, carrying the commutator C, is supplied with a direct current from the exciter-dynamo E through the circuit $F^2$, which circuit $F^2$ is provided with collector rings and brushes. (Not shown.)

The current and E. M. F. from one coil K is led to transformers T and T' and that from the secondary coil K' is led to transformers $T^2$ and $T^3$. The primaries $P' P^2$ and $P^3 P^4$ of each pair of these transformers are in series. The secondaries $S'$ and $S^2$ of one pair are led to brushes 1 2 3 in such a manner that the E. M. F. of one opposes that of the other, so that their resultant sum is zero. Similarly, the secondaries $S^3$ and $S^4$ of the other pair are led to brushes 4 5 6 in such a manner that their E. M. F. oppose each other and their resultant sum is zero. The commutator-bars $B' B^2 B^3$ and so on revolving synchronously alternately short-circuits the E. M. F. of one coil or the other of each pair of secondary coils at the brushes 1 2 3, also at the brushes 4 5 6, so that a unidirectional E. M. F. is maintained between brushes 1 and 2, also a unidirectional E. M. F. is maintained between brushes 4 and 6. The secondaries of the pairs of transformers T T' and $T^2 T^4$ are relatively connected so that the unidirectional E. M. F. between brushes 1 and 3 is opposite to and opposes that between brushes 4 and 6, so that when they are equal their resultant sum is zero. It will be readily seen that when the E. M. F. in transformer T and T' is greater or less than the E. M. F. in the transformers $T^2$ and $T^3$ the sum of the unidirectional E. M. F. is not zero, but either a positive or negative quantity, according to the direction of the E. M. F. predominating. When either alternating E. M. F. is varied relative to the other by movements of the laminated core L, the E. M. F. resultant from the two pulsating unidirectional E. M. F.'s is made to add to or depress the E. M. F. of the current flowing in the circuit, and therefore in the field-circuit F and F'. It is therefore clear that as the core L moves in response to variations in the E. M. F. and current in the coil P, due to the generator G, the resultant unidirectional E. M. F. between brushes 1 and 6 varies and regulates the field strength of the generator G. If the core L is properly counterbalanced, the movement of the core L through its entire range required can be brought about by a very slight variation of the E. M. F. of the circuit M, and the counterbalancing of the core can be arranged so that a given variation of the main circuit E. M. F. applied to coil P will produce a greater or less change in E. M. F. in circuit F at either extreme position of the core L, as desired, thus producing either an increasing change in excitation of the machine throughout the entire range of the core L or a decreasing change, as desired.

Fig. 2 shows a similar arrangement, except that the regulating E. M. F. is applied direct to the coils that are used as secondaries in Fig. 1, the primary I of Fig. 1 being omitted.

As the total E. M. F. applied to the terminals of the two coils K and K', Fig. 2, in series from circuit M varies, the position of the core L with relation to the two coils changes and the relative voltage drop through the two coils changes also. As the voltage of coil K or K' predominates, the voltage through the rectifier applied to the D. C. exciting-circuit varies, as shown in Fig. 1, and regulates the E. M. F. of the circuit M in the same manner.

In Fig. 1 the commutator of bars $B' B^2 B^3 B^4 B^5$ and so on is shown mounted on the revolving field-frame of the synchronous motor R A. This field-frame can be excited from any convenient source of direct current, such as the exciter E. The armature A of the synchronous motor is shown as stationary and is excited from the source of alternating current to be rectified. The brushes 1 2 3 and 4 5 6 are stationary. Any desired number of bars and brushes can be utilized, giving due regard to the synchronous speed required. In Fig. 1 only a few brushes are shown connected, it being evident that more brushes on the same commutator can be connected in, if desired.

It will be understood that different mechanical arrangements of our regulator can be made without departing from the true spirit of our invention.

What we claim as new, and wish to protect by Letters Patent, is—

1. The combination of a direct-current field-magnet circuit, a source of alternating electromotive force dependent upon said direct-current field-magnet circuit, means for translating said alternating electromotive force into two unidirectional pulsating electromotive forces of opposite sign, means for connecting said unidirectional electromotive forces in series with said direct-current field-magnet circuit, and means for automatically varying one or both of the opposing electromotive forces in response to variations in said alternating electromotive force.

2. The combination of a direct-current field-magnet circuit, a source of alternating electromotive force dependent upon said direct-current field-magnet circuit, means of deriving a plurality of alternating electromotive forces of differing phase relation from said alternating electromotive forces, means of connecting said different-phased alternating electromotive forces in series with said direct-current field-magnet circuit, a synchronously-revolving commutator arranged with brushes to short-circuit synchronously all electromotive forces of other than one sign, and means for regulating the resultant unidirectional electromotive force in response to variations in said alternating electromotive force by regulating automatically the alternating electromotive forces and current applied in series with said field-circuit.

3. The combination of a direct-current field-magnet circuit, a source of alternating electromotive force dependent upon said direct-current field-magnet circuit, means for translating said alternating electromotive force into a plurality of unidirectional electromotive forces of opposite signs whose algebraic sum is zero, and means for automatically varying some or all of said unidirectional electromotive forces so that their algebraic sum is greater or less than zero in response to variations in said alternating electromotive force said unidirectional electromotive force being in series with said direct-current field-magnet circuit.

4. The combination of a direct-current field-magnet circuit, a source of alternating electromotive force to be regulated dependent upon said direct-current field-magnet circuit, a rectifier having brushes and commutator in series with said direct-current field-magnet circuit, said rectifier connected to said source of alternating electromotive force through transformers and an induction-regulator automatically responsive to variations in said alternating electromotive force, said rectifier and transformers arranged so as to provide two or more independent circuits through it for the direct-current field-current.

5. The combination in a voltage-regulator, of a direct-current field-magnet circuit, a source of alternating electromotive force dependent upon said field-circuit, a plurality of pairs of transformers whose primaries receive current from said source of alternating electromotive force through an induction-regulator responsive automatically to variations in said electromotive force, primaries of each pair of said transformers being in series; secondaries of each pair of transformers joined in series and in series with said direct-current field-circuit and joined to pairs of brushes in opposition, so that the electromotive force of each pair at the brushes is zero; a commutator of a plurality of insulated bars arranged with brushes to short-circuit one electromotive force of each pair of secondaries synchronously in succession.

6. The combination of a direct-current field-magnet circuit F, an alternating-current main circuit M, transformers T' T$^2$ T$^3$ T$^4$, induction-regulator I, commutator C, or bars B' B$^2$ B$^3$ B$^4$, &c., a synchronous driving-motor for said commutator, all arranged connected together and for the purpose substantially as set forth.

In testimony whereof we affix our signatures in presence of two witnesses.

EDWIN H. PORTER.
BURLEIGH CURRIER.

Witnesses:
WM. A. ALLISON,
WM. R. STACKHOUSE.